United States Patent [19]

Russell

[11] 3,967,660

[45] July 6, 1976

[54] FUEL OVERFLOW CONTROL DEVICE FOR BOATS

[76] Inventor: James E. Russell, One Tom's Point Lane, Port Washington, N.Y. 11050

[22] Filed: Oct. 15, 1974

[21] Appl. No.: 514,471

[52] U.S. Cl. ................................. 141/95; 141/392
[51] Int. Cl.² ........................................... B65B 3/26
[58] Field of Search ................ 141/94, 95, 98, 286, 141/290, 297–300, 311, 331–345, 367, 368, 390, 391, 392; 220/86 F, 86 R

[56] References Cited
UNITED STATES PATENTS

| 1,230,356 | 6/1917 | Wheaton | 141/392 X |
| 2,778,390 | 1/1957 | Young, Jr. | 141/392 X |
| 3,211,195 | 10/1965 | Porter | 141/367 X |
| 3,771,578 | 11/1973 | Huff | 141/340 X |

FOREIGN PATENTS OR APPLICATIONS

| 262,613 | 1/1926 | United Kingdom | 141/392 |

Primary Examiner—Richard E. Aegerter
Assistant Examiner—Frederick R. Schmidt
Attorney, Agent, or Firm—Bauer, Amer & King

[57] ABSTRACT

To minimize gasoline spillage during the fueling of a pleasure boat, use is made of an overflow device that may be of a see-through plastic shaped to provide an adequate overflow chamber, which is positioned in the gas tank filler pipe, thereby enabling an overflow situation to be visually detected and appropriately attended to. Static electricity grounding during the fueling procedure, which ordinarily is achieved simply by establishing contact between the fueling nozzle and filler pipe, is, in this instance, achieved just as readily, even though the plastic device separates the fueling nozzle and filler pipe, merely upon the projection of the fueling nozzle into the overflow device.

5 Claims, 4 Drawing Figures

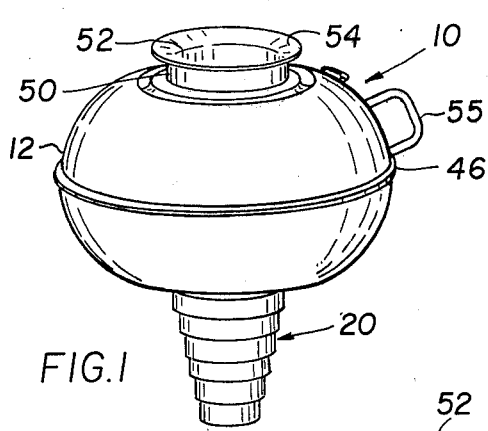
FIG.1
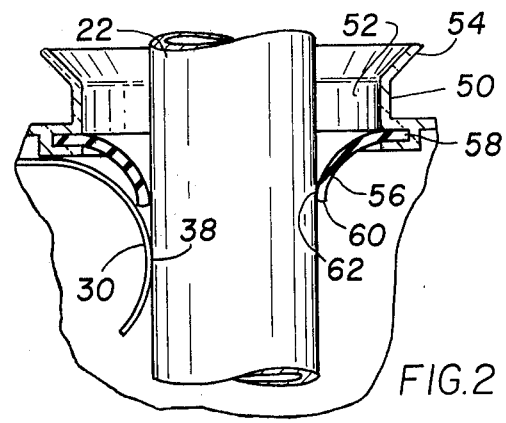
FIG.2
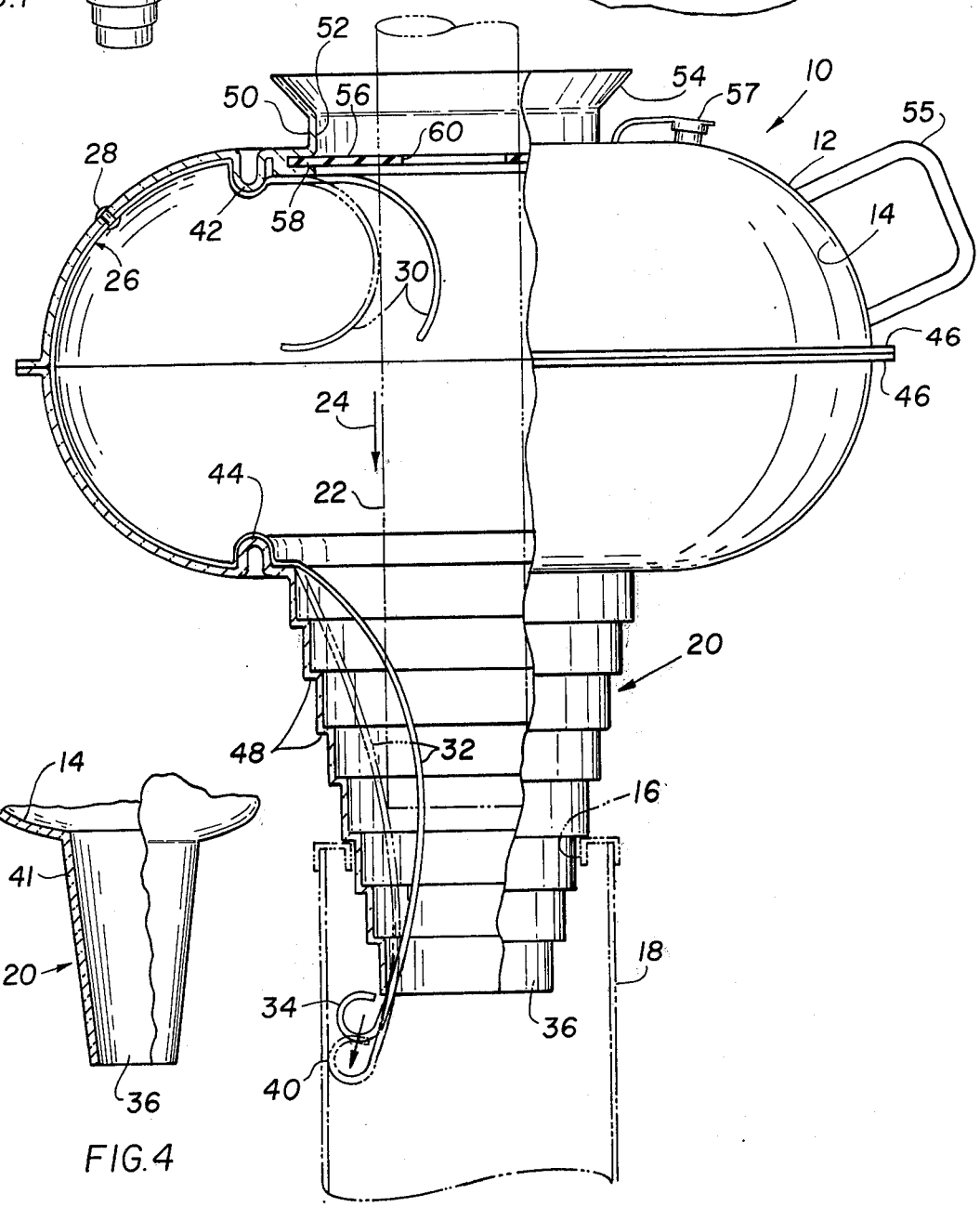
FIG.3
FIG.4

FUEL OVERFLOW CONTROL DEVICE FOR BOATS

The present invention relates generally to improved means for preventing gasoline spillage during fueling of pleasure boats or the like and more particularly to a device for effectively providing a temporary storage chamber for overflowing gasoline in the event of its back-up during the fueling procedure.

The problems associated with the fueling of pleasure boats, automobiles and similar gasoline-powered vehicles are discussed at length in the patent literature, as for example in U.S. Pat. Nos. 2,344,582 and 3,291,165. To prevent spillage of overflowing gasoline, it is channeled into an overflow chamber, as indicated for example in the latter noted patent. To make this chamber available, however, use is made of unnecessarily complicated and expensive adaptors, attachments and other such additions to the fueling nozzle and/or gas tank filler pipe.

Broadly, it is an object of the present invention to provide a shaped article, capable of simple, economic manufacture, to effectively minimize the aforesaid fueling problems and, simultaneously, overcoming the foregoing and other shortcomings of prior art overflow fuel control devices. Specifically, it is an object to control fuel overflow by visual detection of its occurrence, using a simply fabricated funneltype device that nevertheless maintains safe conditions during the fueling procedure, such as providing grounding against static electricity discharge, sealing of gasoline fumes, and other desirable requirements.

A fuel overflow control device, having applicability particularly for pleasure boats, which demonstrates objects and advantages of the present invention, includes a see-through plastic body bounding an overflow chamber having an operative position in which it is placed, like a funnel, into the filler pipe. In this position, the user is provided with a visual signal when to terminate the fueling procedure, i.e., when he sees the chamber filling with overflowing fuel. The body has an inlet opening thereinto and a depending funnel extension having an exit opening into said filler pipe, and intermediate these inlet and exit openings there is an access path to the filler pipe provided for the fueling nozzle. A static electricity grounding means is supported on the plastic body and has an upper and lower pair of contacts extending into said fueling nozzle access path so as to establish grounding contact with the fueling nozzle in its operative position projected along the access path. The lower contact is constructed of a springy material and is formed in a bowed configuration with a depending movable contact end, whereby in response to the flattening of the lower contact by the inwardly projected fueling nozzle, the contact end of said lower contact is urged into grounding contact with the filler pipe.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view of a fuel overflow control device according to the present invention;

FIG. 2 is a partial detailed view, on an enlarged scale, illustrating the inlet opening seal in sealing contact with the fueling nozzle;

FIG. 3 is a side elevational view illustrating in phantom perspective the grounding contact made with the fueling nozzle in its fully projected position within the fuel overflow control device; and FIG. 4 is a partial elevational view of a modification of the outlet.

In the fueling of pleasure boats, it is not uncommon for the gasoline fuel to back up through the inlet opening of the filler pipe to the gasoline tank and spill on the pleasure boat deck or other external surfaces. Fuel back-up could be due to turbulence, malfunction in the overflow conduit conventionally provided for the filler pipe, or for any number of other reasons. As an effective solution, use is made of the fuel overflow control device, generally designated 10 in the accompanying drawings. Device 10 has a generally spherical body 12 which bounds a sufficiently large internal chamber 14 for temporary storage of any gasoline which might back up and flow in a reverse direction out of the inlet opening 16 of the gasoline fuel tank filler pipe 18. Although there are prior art devices which also include a temporary storage chamber for overflowing gasoline, device 10 hereof embodies significant improvements. Among these improvements is use of a plastic material of construction for the spherical body 12 that is translucent, or transparent, and thus has a see-through aspect which, in an obvious manner, provides a visual signal to the user as to when the fueling process should be discontinued because of overflowing fuel. That is, during use of the device 10, when fuel is observed through the see-through plastic body 12 in the storage tank 14, the fueling process is stopped and the gasoline in the chamber 14 allowed to drain from the storage chamber 14 down through the depending funnel-type construction 20 back into the filler pipe 18, and from thence back into the gasoline fuel tank.

In addition to providing a visual signal, the plastic body 12, which is advantageously in the spherical shape indicated so as to bound a comparatively large storage volume 14, is readily economically produced. As a plastic article of manufacture, it is readily injection molded in large volumes, and thus at an economic unit cost.

The use of the plastic construction material for the device 10, however, requires embodying in the device appropriate means for electrically grounding the metal fueling nozzle 22 when the same, as illustrated in FIGS. 2, 3, is inserted into and projected through movement 24 centrally of the device 10 and into position for delivering the gasoline into the filler pipe 18. In the absence of an appropriate ground being established for the fueling nozzle 22, there is a danger that static electricity can discharge a spark causing ignition of the gasoline during the fueling procedure.

In accordance with the present invention, the static electricity grounding means provided consists of a strip of flexible metal 26 having an arcuate shape conforming to that of the plastic body 12. As illustrated in FIG. 3, the medial portion of strip 26 is conveniently disposed along the interior of the chamber 14 and fixedly riveted thereto, as at 28. The upper curved contact end of the grounding strip 26, designated 30, is left unattached to any supporting structure and extends into the path 24 of the fueling nozzle when the same is inserted into the open inlet of the chamber 14 to assume its fueling position relative to the filler pipe 18.

The opposite lower end 32 of the strip 26 has a normally bowed shape, as illustrated in solid lines to extend into the access path 24 of the fueling nozzle 22. The terminal contact end 34 of the ground strip 26 extends beyond and out of the exit opening 36 of the funnel construction 20 so that in the fueling position of the overflow control device 10, in which it is seated in the filler pipe 18, the contact end 34 is flexed by the nozzle 22 to force the same into engagement with the inner surface of the metal filler pipe 18. When the fueling nozzle 22 is inserted within the device 10 and urged along the path 24, physical contact is established initially with the strip upper end 30 that obstructs access to the inlet, flexing the same from its solid to broken line position. Further insertion causes the nozzle to subsequently engage with the bowed, lower portion 32. Since strip 26 is fabricated of a springy metal, upper end 30 is brushed to the side of the path 24, and both 30 and 32 maintain their physical contact, as at 38, with the fueling nozzle 22, as illustrated in FIG. 2.

As best illustrated in FIG. 3, continued movement of the fueling nozzle 22 along the access path 24 brings it in physical contact with the bowed portion 32 and causes a flattening in the bowed shape. In response to this flattening, the contact end 34 of the grounding strip 26 is moved into actual physical contact, as at 40, with the metal filler pipe 18. In this manner, metal-to-metal contact is established between the fueling nozzle 22, metal grounding strip 26, and the metal filler pipe 18, thereby obviating any possibility of a spark discharge due to static electricity or any other electrical phenomenon.

Assisting the rivet 28 in maintaining the proper position for the grounding strip 26 are upper and lower molded ridges 42 and 44, on which conforming shapes embodied in the ground strip 26 are appropriately seated. Although the body 12 may be blow molded as a single element, the molding of the plastic spherical body 12 shown and described requires construction in two halves, which are closed upon each other along a laterally extending lip or ridge 46. This two-part construction of the spherical body 12 contributes to the ease in mounting the grounding strip 26 on the interior wall 14 of the body 12. That is, strip 26 is attached at 28 to the upper spherical half, and this half is then closed upon the lower spherical half during the joining of these two halves to each other to form the storage compartment 14. An adhesive applied to the interface of the ridges 46 completes the connection of these sperical halves to each other.

To enable device 10 to fit a range of sizes of filler pipes 18, the funnel construction 20 is designed as a depending structure with a series of sections of progressively diminishing diameters, illustrated in FIGS. 1 to 3 by shoulders 48 at varying diameters for purposes of seating the device 10 in the inlet opening of the filler pipe 18. A snug, fluid-tight fit between the outer surface of the funnel 20 and a range of filler pipes 18 of differently sized diameters may be effected along the exterior of the funnel that tapers outward in a direction away from the exit opening 36 as shown at 41 in FIG. 4. When the outer surface 41 is made of a soft or yieldable plastic material, it will snugly grip the filler pipe 18 fluid-tight to prevent unwanted back flow.

At the upper end of the device 10, there is an annular upstanding wall 50 which defines the inlet opening 52. Connected to wall 50 is a short funnel-type section 54 coextensive with the inlet 52 and which assists in guiding the fueling nozzle 22 into the device 10. At times when additional fluids must be poured into the filler pipe 18, the same may be poured into the funnel 54 to flow downward through the inlet 52.

Optionally, a hand grip or handle 55 is advantageously molded on one of the spherical body members. As indicated in FIG. 3, a capped air vent structure 57 is also desirable.

Completing the construction of the device 10 is an elastomeric or rubber washer 56 having its peripheral edge seated in a circular groove beneath the wall 50, as at 58, and having an opening 60 in its medial portion. As best illustrated in FIG. 2, the fueling nozzle 22 is forced through the opening 60 which expands to accommodate the fueling nozzle 22, and this establishes sealing contact, as at 62, with the fueling nozzle 22. Seal 62 prevents escape of any gasoline or fumes which back up into the storage chamber 14 and also confines the gasoline fumes to the storage chamber 14.

During the fueling procedure, if there is any back-up of gasoline, this gasoline will rise through the funnel construction 20 into the storage chamber 14. The presence of the gasoline in the chamber 14 will signal the operator to discontinue the fueling procedure. When this is done, in most instances the turbulence of the gasoline within the fuel tank will no longer be a factor, and will result in the overflow volume of gasoline within the storage chamber 14 flowing by gravity back into the filler pipe 18.

From the foregoing it should be readily appreciated that there has been described herein a fuel overflow control device 10 which has numerous advantages due to its plastic material of construction, but which nevertheless can be safely used without fear of sparking or other electrical discharge which could result in a dangerous situation during the fueling procedure.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A fuel overflow control device for use with a fueling nozzle and a filler pipe communicating with a boat fuel tank comprising a see-through plastic body bounding an overflow chamber having an operative position projected into said filler pipe so as to visually signal termination of the fueling procedure when said plastic body fills with fuel overflowing from said boat fuel tank, said body having an inlet opening thereinto and a depending funnel having an exit opening into said filler pipe, and intermediate said inlet and exit openings there being defined centrally of said body a fueling nozzle access path to said filler pipe, and a static electricity grounding means supported on the interior of said plastic body having upper and lower contacts extending into said fueling nozzle access path so as to establish grounding contact with said fueling nozzle in its operative position projected into said plastic body and along said access path thereof, said lower contact being constructed of a springy metal formed in a bowed configuration with a depending movable contact end, whereby in response to the flattening of said lower contact by said inwardly projected fueling nozzle said contact end thereon is urged into grounding contact with said filler pipe.

2. The overflow control device as claimed in claim 1 including a stepped construction in the external surface of said funnel to contribute to the fitting thereof in a range of different sizes of filler pipes.

3. The overflow control device as claimed in claim 2 including an elastomeric member in spanning relation across said inlet opening to sealingly engage said fueling nozzle when it is projected through said inlet opening.

4. The overflow control device as claimed in claim 3 wherein said plastic body is of a spherical shape so as to provide an adequate storage volume for overflowing fuel.

5. The overflow control device as claimed in claim 4 wherein said spherical shape is formed by cooperating members adapted to be closed against each other after said static electricity grounding means is placed in its mounted position on said half-spherical members.

* * * * *